United States Patent
Toyonaga et al.

(10) Patent No.: US 12,452,055 B2
(45) Date of Patent: Oct. 21, 2025

(54) REQUEST VERIFICATION SYSTEM AND REQUEST VERIFICATION METHOD FOR VERIFYING A CLIENT REQUEST WITHOUT LEAKING PRIVATE INFORMATION OF A CLIENT APPARATUS

(71) Applicant: PANASONIC INTELLECTUAL PROPERTY MANAGEMENT CO., LTD., Osaka (JP)

(72) Inventors: Saburo Toyonaga, Fukuoka (JP); Masakiyo Sakamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 18/206,483

(22) Filed: Jun. 6, 2023

(65) Prior Publication Data

US 2023/0318828 A1    Oct. 5, 2023

Related U.S. Application Data

(63) Continuation of application No. PCT/JP2021/045219, filed on Dec. 8, 2021.

(30) Foreign Application Priority Data

Dec. 9, 2020   (JP) .................. 2020-204248

(51) Int. Cl.
  *H04L 9/30*   (2006.01)
  *H04L 9/32*   (2006.01)
(52) U.S. Cl.
  CPC .............. *H04L 9/30* (2013.01); *H04L 9/3263* (2013.01)

(58) Field of Classification Search
  CPC ....... H04L 9/30; H04L 9/3263; H04L 9/3236; H04L 9/3247; H04L 9/3268; G06F 21/33
  (Continued)

(56) References Cited

U.S. PATENT DOCUMENTS 6,842,741 B1   1/2005   Fujimura
7,171,559 B1 *  1/2007   Bao ................... H04L 9/3013
                                                                  713/169

(Continued)

FOREIGN PATENT DOCUMENTS

JP   2000-123095   4/2000
JP   2001-084311   3/2001

(Continued)

OTHER PUBLICATIONS

International Search Report (ISR) from International Searching Authority (Japan Patent Office) in International Pat. Appl. No. PCT/JP2021/045219, dated Mar. 8, 2022, together with an English language translation.

*Primary Examiner* — Bryan F Wright
(74) *Attorney, Agent, or Firm* — Greenblum & Bernstein, P.L.C.

(57) ABSTRACT

A request verification system includes an authorization data generation apparatus, a verification apparatus, and a client apparatus. The authorization data generation apparatus stores a certificate including a public key and is configured to generate and output authorization data for authorizing a providing of a service. The verification apparatus is configured to share the certificate with the authorization data generation apparatus. The client apparatus is configured to use the provided service. In response to receiving a verification request of the authorization data from the client apparatus, the verification apparatus verifies the authorization data using the certificate.

9 Claims, 10 Drawing Sheets

(58) Field of Classification Search
USPC .......................................................... 713/171
See application file for complete search history.

(56) References Cited

U.S. PATENT DOCUMENTS

| | | | |
|---|---|---|---|
| 7,392,226 | B1 | 6/2008 | Sasaki et al. |
| 8,595,816 | B2* | 11/2013 | Karasawa ............... G06F 21/33 |
| | | | 726/10 |
| 2001/0034834 | A1 | 10/2001 | Matsuyama et al. |
| 2007/0016533 | A1 | 1/2007 | Fujimura |
| 2007/0022469 | A1* | 1/2007 | Cooper ................ H04L 9/3247 |
| | | | 726/3 |
| 2013/0326215 | A1* | 12/2013 | Leggette ............... G06F 21/604 |
| | | | 726/10 |
| 2014/0019764 | A1* | 1/2014 | Gopal ................... H04L 9/3247 |
| | | | 713/176 |

FOREIGN PATENT DOCUMENTS

| | | |
|---|---|---|
| JP | 2001-320356 | 11/2001 |
| JP | 2004-032220 | 1/2004 |
| JP | 2012-049752 | 3/2012 |

* cited by examiner

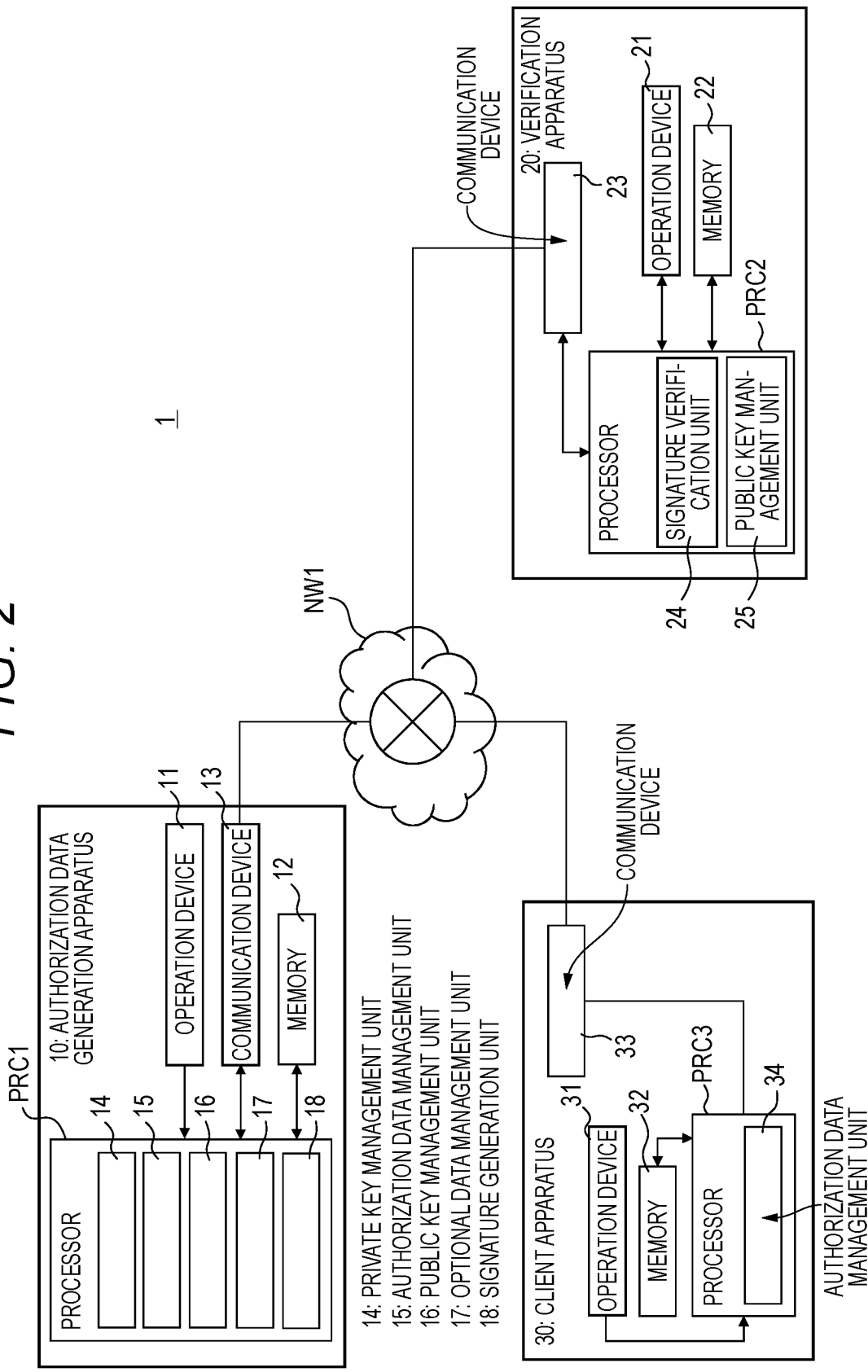

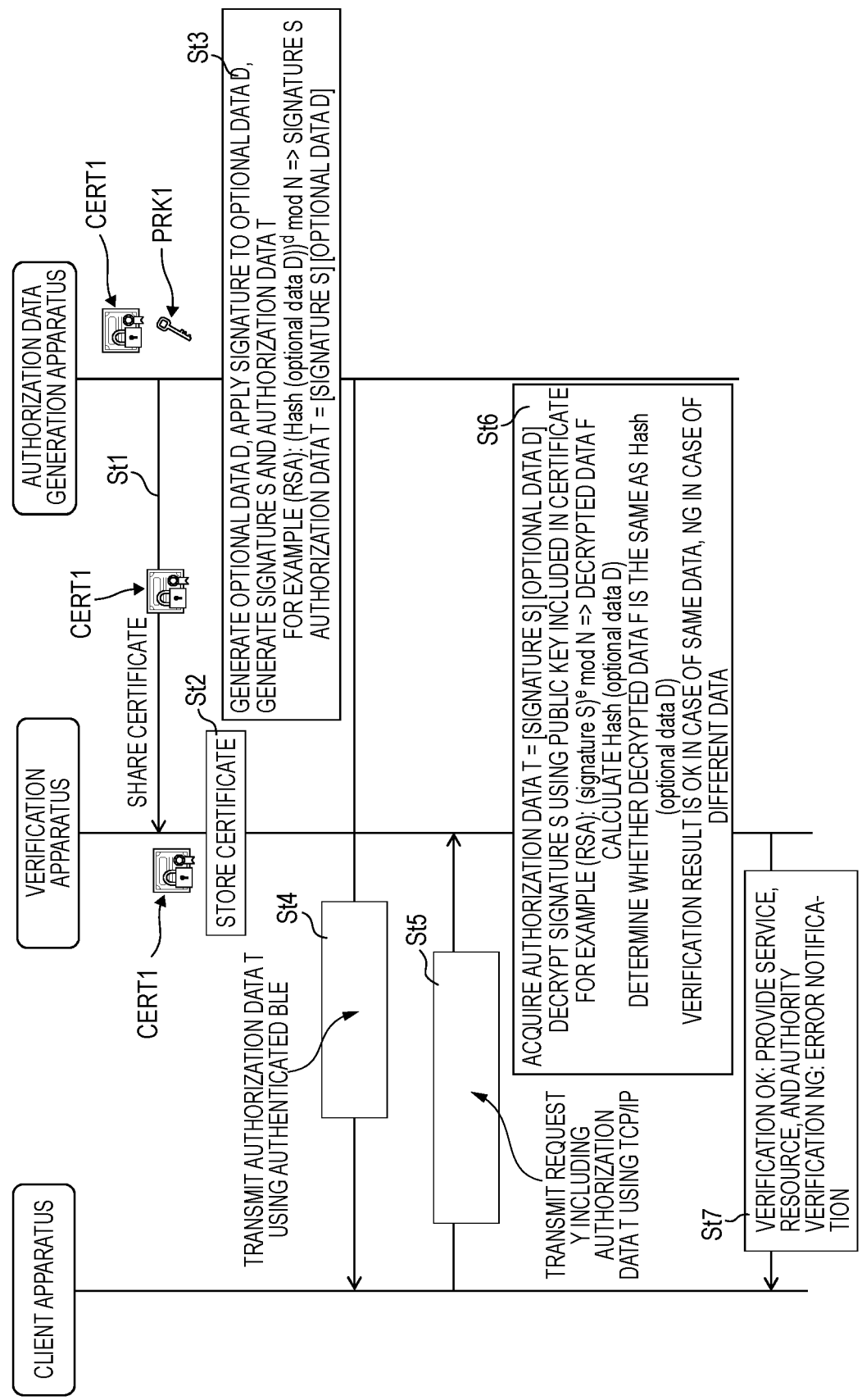

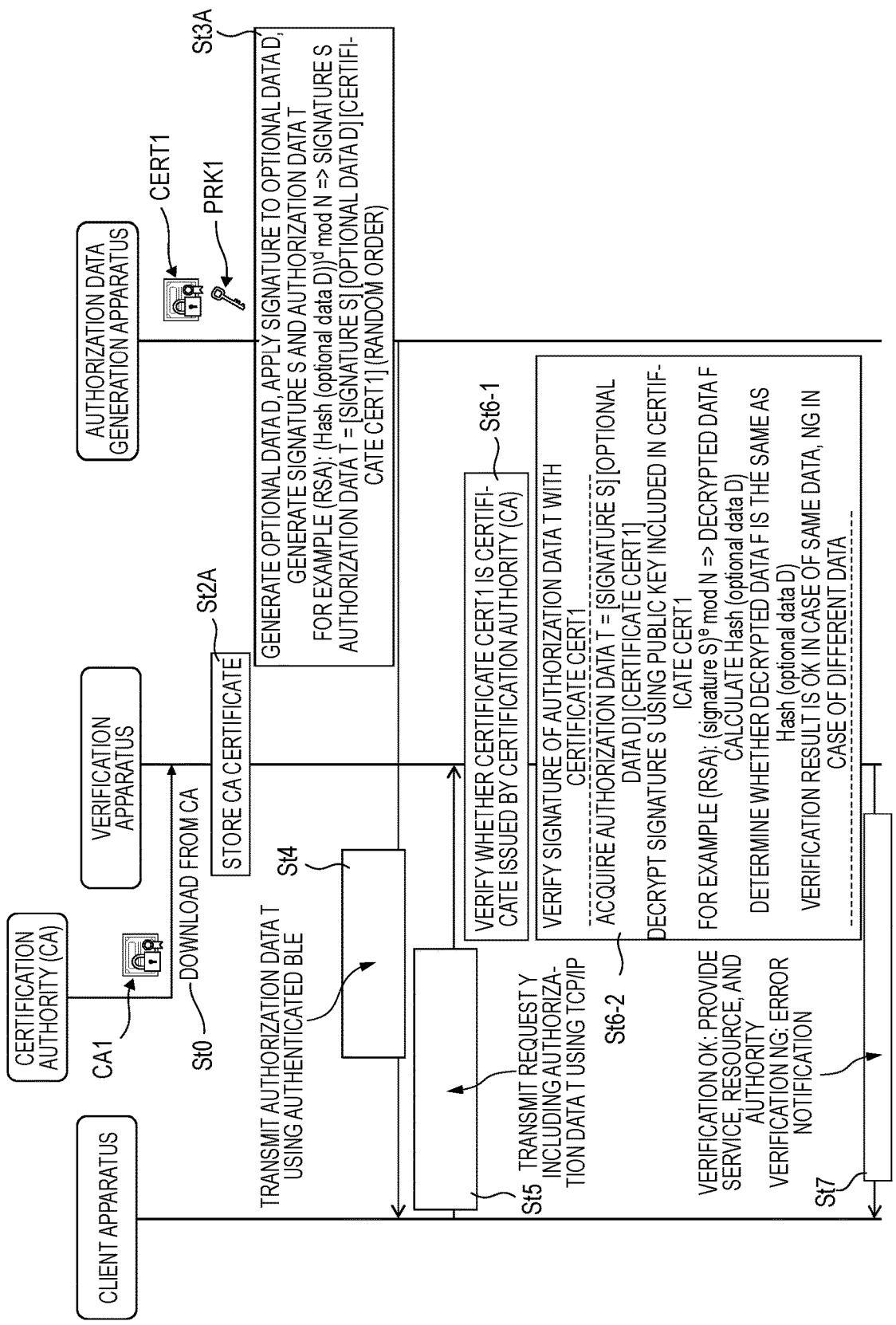

FIG. 5

GENERATED ID

[ID OF AUTHORIZATION DATA GENERATION APPARATUS][COUNTER VALUE]

FOR EXAMPLE: 01AA0000000000000001

| ID | TYPES OF CERTIFICATES TO BE ISSUED (WITH EXPIRATION DATE) |
|---|---|
| 01AA00000000.... | SERVER CERTIFICATE (EXPIRATION DATE 10 YEARS) |
| 01AB00000000.... | CLIENT CERTIFICATE (EXPIRATION DATE ONE YEAR) |
| 01AC00000000.... | CODE INNING CERTIFICATE (EXPIRATION DATE 10 YEARS) |
| ... | ... |

TBL1

WITH REFERENCE TO

ISSUE SERVER CERTIFICATE (EXPIRATION DATE 10 YEARS)

REQUEST VERIFICATION SYSTEM AND REQUEST VERIFICATION METHOD FOR VERIFYING A CLIENT REQUEST WITHOUT LEAKING PRIVATE INFORMATION OF A CLIENT APPARATUS

CROSS-REFERENCE TO RELATED APPLICATIONS

This is a continuation of International Application No. PCT/JP2021/045219 filed on Dec. 8, 2021, and claims priority from Japanese Patent Application No. 2020-204248 filed on Dec. 9, 2020, the entire content of which is incorporated herein by reference.

TECHNICAL FIELD

The present disclosure relates to a request verification system and a request verification method.

BACKGROUND ART

JP-A-2004-32220 discloses an access authority management apparatus including an electronic ticket generation device and an application device. The electronic ticket generation device acquires specific information for specifying a client apparatus owned by a user (for example, information based on private information of the client apparatus), and generates an electronic ticket using the specific information. The application device communicates with the client apparatus, and inspects the electronic ticket to verify an access qualification of the user.

In a configuration of JP-A-2004-32220, the specific information based on the private information of the client apparatus is shared by both the client apparatus and the electronic ticket generation device, and is further transmitted from the electronic ticket generation device to the application device. Therefore, there is a risk of leakage of the specific information, and thus security of the client apparatus may be decreased.

The present disclosure has been devised in view of the above circumstances in related art, and an object thereof is to provide a request verification system and a request verification method that safely verify a request of a user without leaking private information of a client apparatus and preventing a decrease in security of the client apparatus.

Aspect of non-limiting embodiments of the present disclosure relates to provide a request verification system including:
  an authorization data generation apparatus that stores a certificate including a public key and is configured to generate and output authorization data for authorizing a providing of a service; and
  a verification apparatus configured to share the certificate with the authorization data generation apparatus; and
  a client apparatus configured to use the provided service, in which
  in response to receiving a verification request of the authorization data from the client apparatus, the verification apparatus verifies the authorization data using the certificate.

Aspect of non-limiting embodiments of the present disclosure also relates to provide a request verification method including:
  generating and outputting authorization data for authorizing a providing of a service, and storing a certificate including a public key;
  sharing the certificate; and
  in response to receiving a verification request on the authorization data, verifying the authorization data using the certificate.

According to the present disclosure, it is possible to safely verify a request of a user without leaking private information of a client apparatus, and to prevent a decrease in security of the client apparatus.

BRIEF DESCRIPTION OF DRAWINGS

FIG. 2 is a block diagram showing a hardware configuration example of each apparatus constituting the request verification system according to the first embodiment;

FIG. 3A is a sequence diagram showing an example of an operation procedure of the request verification system according to the first embodiment;

FIG. 3B is a sequence diagram showing another example of the operation procedure of the request verification system according to the first embodiment;

FIG. 5 is a diagram showing an outline example of a procedure for determining a certificate to be issued corresponding to an ID;

DESCRIPTION OF EMBODIMENTS

Hereinafter, embodiments specifically disclosing a request verification system and a request verification method according to the present disclosure will be described in detail with reference to the drawings as appropriate. However, unnecessary detailed description may be omitted. For example, detailed description of a well-known matter or repeated description of substantially the same configuration may be omitted. This is to avoid unnecessary redundancy in the following description and to facilitate understanding for those skilled in the art. The accompanying drawings and the following description are provided for a thorough understanding of the present disclosure for those skilled in the art, and are not intended to limit the subject matter in the claims.

First Embodiment

In a request verification system according to a first embodiment, when a verification apparatus constituting the request verification system receives, from a client apparatus, a request (for example, applications of issuance of an electronic certificate of the client apparatus and transmission of the electronic certificate to the client apparatus) desired by a user, the verification apparatus verifies authorization data (see below) included in the request. When it is determined that the verification is successful, the verification apparatus provides, to the client apparatus, a response (for example, the issuance of the electronic certificate of the client apparatus and the transmission of the electronic certificate to the client apparatus) to the request. When it is determined that the verification fails, the verification apparatus transmits an error notification indicating that the verification fails to the client apparatus.

Figure 1:
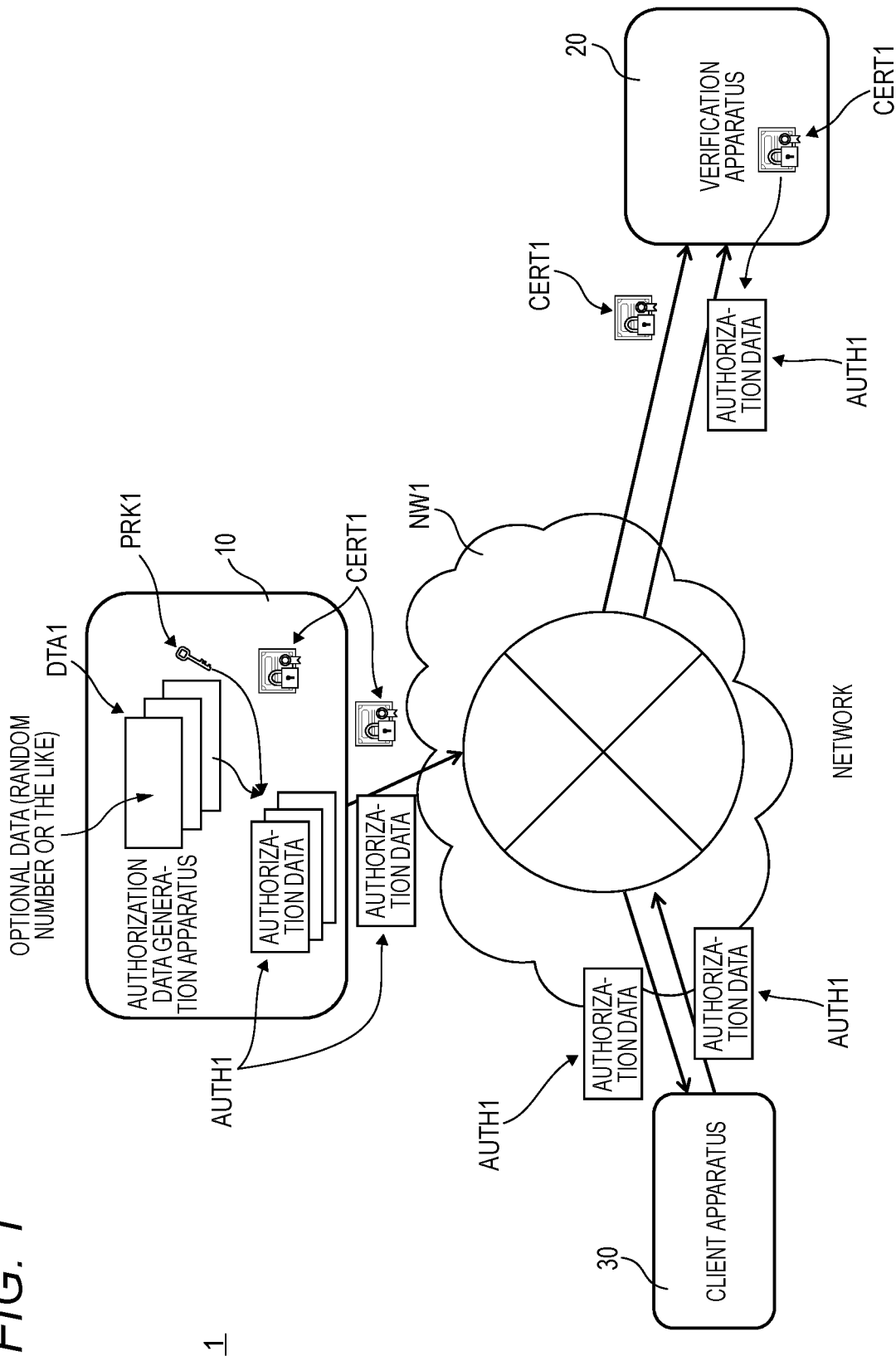
FIG. 1 is a diagram showing a system configuration example of a request verification system according to a first embodiment.

FIG. 1 is a diagram showing a system configuration example of a request verification system 1 according to the first embodiment. The request verification system 1 includes at least an authorization data generation apparatus 10 and a verification apparatus 20. The request verification system 1 may further include a client apparatus 30. Although only one client apparatus 30 is shown in FIG. 1, two or more client apparatuses 30 may be connected to a network NW1. The authorization data generation apparatus 10, the verification apparatus 20, and the client apparatus 30 are communicably connected to each other via the network NW1. The network NW1 may be a wired network (for example, a wired local area network (LAN)) or a wireless network (for example, a wireless LAN).

The authorization data generation apparatus 10 generates data (hereinafter referred to as "authorization data") indicating that provision of a response (see above) to a request (see above) desired by a user using the client apparatus 30 is authorized, and transmits the authorization data to the client apparatus 30. The authorization data generation apparatus 10 stores a private key PRK1 of the authorization data generation apparatus 10, and generates authorization data AUTH1 by connecting optional dataDTA1 (for example, a random number), and a signature (may be referred to as an "electronic signature") generated by encrypting the optional data DTA1 or a hash value of the optional data DTA1 with the private key PRK1 of the authorization data generation apparatus 10. The authorization data generation apparatus 10 and the verification apparatus 20 share in advance a hash function used for calculating a hash value. The authorization data generation apparatus 10 stores a certificate CERT1 (may be referred to as an "electronic certificate") including a public key of the authorization data generation apparatus 10, and shares the certificate CERT1 with the verification apparatus 20. The certificate CERT1 is generated (issued) for the authorization data generation apparatus 10 by CA to be described later, includes at least a signature (not shown) generated by encrypting optional data by the CA using a private key (not shown) of the CA, optional data used to generate the signature, a public key of the CA, and the public key of the authorization data generation apparatus 10, and is held in the authorization data generation apparatus 10. As the optional data to be encrypted by the CA using the private key of the CA, the same data is used when the CA generates one or more certificates (for example, the certificate CERT1 and a CA certificate CA1).

The request verification system 1 may include a plurality of authorization data generation apparatuses 10, and in this case, it is possible to appropriately switch the authorization data generation apparatuses 10 having the certificate CERT1 having a use authority to be granted to the client apparatus 30 and to cause the client apparatus 30 store a desired certificate CERT1 from the corresponding authorization data generation apparatus 10.

When receiving a request from the client apparatus 30, the verification apparatus 20 verifies authorization data AUTH1 (see above) included in the request using the public key (for example, the public key of the authorization data generation apparatus 10) included in the certificate CERT1 shared with the authorization data generation apparatus 10 in advance. Although details will be described later, the verification apparatus 20 may verify the authorization data AUTH1 (see above) included in the request using the CA certificate CA1 downloaded and acquired in advance from the CA to be described later. Accordingly, even when the plurality of authorization data generation apparatuses 10 are provided, by simply downloading and acquiring the CA certificate CA1 from the certification authority (CA), the verification apparatus 20 can individually and easily verify the authorization data included in the request from the client apparatus 30 without acquiring and sharing the certificate CERT1 in advance with the plurality of authorization data generation apparatuses 10, and can avoid compression of a memory capacity that may be caused by storing a plurality of certificates CERT1.

When it is determined that the verification is successful, the verification apparatus 20 provides, to the client apparatus 30, a response (for example, issuance of an electronic certificate of the client apparatus 30 and transmission of the electronic certificate to the client apparatus 30) to the above request. When it is determined that the verification fails, the verification apparatus 20 transmits an error notification indicating that the verification fails to the client apparatus 30. In other words, the error notification means that the electronic certificate of the client apparatus 30 cannot be issued (that is, the client apparatus 30 cannot obtain a desired use authority).

The verification apparatus 20 may acquire and store the CA certificate CA1 generated (issued) by the certification authority (CA), which is also called a public certification authority, by downloading the CA certificate CA1 from the CA. The CA certificate CA1 includes at least the signature generated by encrypting the optional data by the CA using the private key (not shown) of the CA, the optional data used to generate the signature, and the public key of the CA. The CA certificate CA1 is the same as the above certificate CERT1. The CA certificate CA1 and the certificate CERT1 may be different from each other, but both are certificates generated (issued) by the same CA.

The client apparatus 30 is used by a user of the request verification system 1, and is, for example, a mobile terminal such as a smartphone or an Internet of Things (IoT) device. The client apparatus 30 may be a personal computer (PC). The client apparatus 30 receives and stores the authorization data AUTH1 generated by the authorization data generation apparatus 10. The client apparatus 30 transmits the request (see above) including the authorization data AUTH1 to the verification apparatus 20. When it is determined that the verification in the verification apparatus 20 for the request is successful, the client apparatus 30 receives, from the verification apparatus 20, provision of the response (for example, the issuance of the electronic certificate of the client apparatus and the transmission of the electronic certificate to the client apparatus) to the request. When it is determined that the verification in the verification apparatus 20 for the request fails, the client apparatus 30 receives the error notification indicating that the verification fails from the verification apparatus 20.

FIG. 2 is a block diagram showing a hardware configuration example of each apparatus constituting the request verification system 1 according to the first embodiment. The request verification system 1 shown in FIG. 2 includes the authorization data generation apparatus 10, the verification apparatus 20, and the client apparatus 30.

The authorization data generation apparatus 10 includes an operation device 11, a memory 12, a communication device 13, and a processor PRC1.

The operation device 11 is a device that receives an operation of a user of the authorization data generation apparatus 10, and includes, for example, at least one of a mouse, a keyboard, a touch pad, and a touch panel. The operation device 11 transmits a signal based on the operation of the user to the processor PRC1.

The memory 12 includes, for example, a random access memory (RAM) and a read only memory (ROM), and temporarily stores a program necessary for executing an operation of the authorization data generation apparatus 10 and data or information generated by the processor PRC1 during the operation. The RAM is, for example, a work memory used during an operation of the processor PRC1. The ROM stores in advance, for example, a program and data for controlling the processor PRC1. The memory 12 may include a storage such as a hard disk drive (HDD), a flash memory, or a solid state drive (SSD) capable of storing data acquired or generated by the processor PRC1.

The communication device 13 includes a communication circuit that transmits and receives data or information to and from the network NW1, and transmits and receives data or information to and from the verification apparatus 20 or one or more client apparatuses 30. The communication device 13 may communicate with the verification apparatus 20 or one or more client apparatuses 30 using a communication path (for example, Bluetooth (registered trademark) low energy (BLE)) with high security that is mutually authenticated.

The processor PRC1 includes, for example, at least one of a central processing unit (CPU), a digital signal processor (DSP), a field programmable gate array (FPGA), and a graphic processing unit (GPU). The processor PRC1 controls an operation of each unit of the authorization data generation apparatus 10. The processor PRC1 may control the operation of the unit of the authorization data generation apparatus 10 based on a signal from the operation device 11. The processor PRC1 functions as a control unit of the authorization data generation apparatus 10, and performs a control process for controlling the overall operations of the units of the authorization data generation apparatus 10, a data input and output process to and from the units of the authorization data generation apparatus 10, a data calculation (computing) process, and a data storage process. The processor PRC1 operates in accordance with execution of a program stored in the ROM in the memory 12. The processor PRC1 includes a private key management unit 14, an authorization data management unit 15, a public key management unit 16, an optional data management unit 17, and a signature generation unit 18 as a functional configuration based on the execution of the above program.

The private key management unit 14 generates and stores the private key (for example, a pair of private keys (d, N) of RSA encryption) of the authorization data generation apparatus 10. A type of the private key may not be limited to the RSA encryption.

The authorization data management unit 15 generates the authorization data AUTH1 by connecting (linking) the signature (so-called the electronic signature) generated by the signature generation unit 18 to the optional data DTA1, and stores the authorization data AUTH1. For example, the authorization data AUTH1 has the following data structure. That is, [authorization data T]=[signature S] [optional data D]. Here, [A] and [B] indicate that data A and data B are connected. The authorization data AUTH1 is generated so as to have a different data entity for each client apparatus 30.

Although details will be described later with reference to FIG. 3B, [authorization data T]=[signature S] [optional data D] [certificate CERT1] may be used.

The public key management unit 16 generates and stores the public key (for example, a pair of public keys (e, N) of RSA encryption) of the authorization data generation apparatus 10. A type of the public key may not be limited to the RSA encryption. The public key management unit 16 generates and stores the certificate CERT1 (that is, the electronic certificate of the authorization data generation apparatus 10) including the generated public key. The certificate CERT1 may be issued by the certification authority (not shown) (see above, the certification authority (CA)).

The optional data management unit 17 generates and stores the optional data DTA1 (for example, a random number or a counter value) constituting the authorization data AUTH1. Here, the optional data DTA1 is optional data having so-called randomness, and is data having no privacy such as a random number, unlike, for example, private information (for example, an internet protocol (IP) address and a media access control (MAC) address) of the client apparatus 30.

The signature generation unit 18 generates the signature by encrypting the optional data DTA1 generated by the optional data management unit 17 using the private key (for example, the pair of (e, N)) generated by the private key management unit 14, and stores the signature. A generation algorithm of the signature is not limited to RSA, and may be, for example, ECDSA. Specifically, the signature generation unit 18 calculates Hash (optional data D) using a predetermined hash function between the authorization data generation apparatus 10 and the verification apparatus 20. Hash (A) is an operator for calculating a hash value (a digest value) of data A, and is, for example, SHA2 or SHA3. The signature generation unit 18 generates the signature S according to calculation of (Hash (optional data D))$^d$ mod N. For example, when a signature is generated with the private key of RSA encryption, the signature can be decrypted using only the public key of the authorization data generation apparatus 10.

The verification apparatus 20 includes an operation device 21, a memory 22, a communication device 23, and a processor PRC2.

The operation device 21 is a device that receives an operation of a user of the verification apparatus 20, and includes, for example, at least one of a mouse, a keyboard, a touch pad, and a touch panel. The operation device 21 transmits a signal based on the operation of the user to the processor PRC2.

The memory 22 includes, for example, a RAM and a ROM, and temporarily stores a program necessary for executing an operation of the verification apparatus 20 and data or information generated by the processor PRC2 during the operation. The RAM is, for example, a work memory used during an operation of the processor PRC2. The ROM stores in advance, for example, a program and data for controlling the processor PRC2. The memory 22 may include a storage such as an HDD, a flash memory, or an SSD capable of storing data acquired or generated by the processor PRC2.

The communication device 23 includes a communication circuit that transmits and receives data or information to and from the network NW1, and transmits and receives data or information to and from the authorization data generation apparatus 10 or one or more client apparatuses 30. The communication device 23 may communicate with the authorization data generation apparatus 10 or one or more client apparatuses 30 by using a communication path (for example, BLE) with high security that is mutually authenticated.

The processor PRC2 includes, for example, at least one of a CPU, a DSP, an FPGA, and a GPU. The processor PRC2 controls an operation of each unit of the verification apparatus 20. The processor PRC2 may control the operation of the unit of the verification apparatus 20 based on a signal from the operation device 21. The processor PRC2 functions as a control unit of the verification apparatus 20, and performs a control process for controlling the overall operations of the units of the verification apparatus 20, a data input and output process to and from the units of the verification apparatus 20, a data calculation (computing) process, and a data storage process. The processor PRC2 operates in accordance with execution of a program stored in the ROM in the memory 22. The processor PRC2 includes a signature verification unit 24 and a public key management unit 25 as a functional configuration based on the execution of the above program.

The signature verification unit 24 verifies the authorization data T included in the request from the client apparatus 30 using the public key (that is, the public key of the authorization data generation apparatus 10) included in the certificate CERT1 (that is, the electronic certificate of the authorization data generation apparatus 10) held by the public key management unit 25. Specifically, when the authorization data T (for example, [signature S][optional data D]) is acquired from the client apparatus 30, the signature verification unit 24 decrypts the signature S using the pair of public keys (e, N). For example, the signature verification unit 24 acquires decrypted data F according to calculation of (signature S)$^e$ mod N, and calculates a hash value (Hash (optional data D)) of the optional data D constituting the authorization data T using the predetermined hash function between the authorization data generation apparatus 10 and the verification apparatus 20. The signature verification unit 24 verifies the authorization data T included in the request from the client apparatus 30 depending on whether the hash value of the optional data D is the same as the decrypted data F. The signature verification unit 24 determines that the verification is successful when it is determined that the hash value of the optional data D is the same as the decrypted data F, and determines that the verification fails when it is determined that the hash value of the optional data D is not the same as the decrypted data F.

When it is determined that the verification is successful, the signature verification unit 24 instructs authorization for the response (for example, the issuance of the electronic certificate of the client apparatus 30 and the transmission of the electronic certificate to the client apparatus 30) to the above request. Based on this instruction, the processor PRC2 issues (generates), for example, the electronic certificate of the client apparatus 30 and provides (transmits) the electronic certificate to the client apparatus 30 via the communication device 23. When it is determined that the verification fails, the signature verification unit 24 transmits the error notification indicating that the verification fails to the client apparatus 30 via the communication device 23.

The public key management unit 25 acquires and stores the certificate (that is, the electronic certificate of the authorization data generation apparatus 10) transmitted to be shared from the authorization data generation apparatus 10 or the CA certificate CA1 (see FIG. 3B) downloaded in advance from the CA (see above). As described above, the certificate transmitted to be shared from the authorization data generation apparatus 10 includes at least the signature generated by the CA, the public key of the CA, and the public key (for example, the pair of (e, N)) of the authorization data generation apparatus 10. As described above, the CA certificate CA1 downloaded in advance from the CA includes at least the signature generated by the CA and the public key of the CA.

The client apparatus 30 includes an operation device 31, a memory 32, a communication device 33, and a processor PRC3.

The operation device 31 is a device that receives an operation of a user of the client apparatus 30, and includes, for example, at least one of a mouse, a keyboard, a touch pad, and a touch panel. The operation device 31 transmits a signal based on the operation of the user to the processor PRC3. The operation device 31 may be omitted from a configuration of the client apparatus 30.

The memory 32 includes, for example, a RAM and a ROM, and temporarily stores a program necessary for executing an operation of the client apparatus 30 and data or information generated by the processor PRC3 during the operation. The RAM is, for example, a work memory used during an operation of the processor PRC3. The ROM stores in advance, for example, a program and data for controlling the processor PRC3. The memory 32 may include a storage such as an HDD, a flash memory, or an SSD capable of storing data acquired or generated by the processor PRC3.

The communication device 33 includes a communication circuit that transmits and receives data or information to and from the network NW1, and transmits and receives data or information to and from the authorization data generation apparatus 10 or the verification apparatus 20. The communication device 33 may communicate with the authorization data generation apparatus 10 or the verification apparatus 20 by using a communication path (for example, BLE) with high security that is mutually authenticated.

The processor PRC3 includes, for example, at least one of a CPU, a DSP, an FPGA, and a GPU. The processor PRC3 controls an operation of each unit of the client apparatus 30. The processor PRC3 may control the operation of the unit of the client apparatus 30 based on a signal from the operation device 31. The processor PRC3 functions as a control unit of the client apparatus 30, and performs a control process for controlling the overall operations of the units of the client apparatus 30, a data input and output process to and from the units of the client apparatus 30, a data calculation (computing) process, and a data storage process. The processor PRC3 operates in accordance with execution of a program stored in the ROM in the memory 32. The processor PRC3 includes an authorization data management unit 34 as a functional configuration based on the execution of the above program.

The authorization data management unit 34 acquires the authorization data T (see above) transmitted from the authorization data generation apparatus 10 via the communication device 33 and stores the authorization data T.

Next, an operation procedure of the request verification system 1 according to the first embodiment will be described with reference to FIGS. 3A and 3B. FIG. 3A is a sequence diagram showing an example of the operation procedure of the request verification system 1 according to the first embodiment. FIG. 3B is a sequence diagram showing another example of the operation procedure of the request verification system 1 according to the first embodiment. In description of FIGS. 3A and 3B, the optional data DTA1 is referred to as the "optional data D", and the authorization data AUTH1 is referred to as the "authorization data T". In the description of FIG. 3B, the same step numbers are assigned to the same processes as those in FIG. 3A, description thereof will be simplified or omitted, and different contents will be described.

In FIG. 3A, the authorization data generation apparatus 10 stores the certificate CERT1 and the private key PRK1 of the authorization data generation apparatus 10, and transmits the certificate CERT1 of the authorization data generation apparatus 10 to the verification apparatus 20 to share the certificate CERT1 (St1). The verification apparatus 20 receives and stores the certificate CERT1 of the authorization data generation apparatus 10 transmitted from the authorization data generation apparatus 10 in step St1 (St2).

The authorization data generation apparatus 10 generates the optional data D such as a random number and generates the signature S by encrypting a hash value (that is, Hash (optional data D)) using the private key PRK1 of the authorization data generation apparatus 10 (St3). The authorization data generation apparatus 10 generates the authorization data T by connecting (linking) the generated signature S to the optional data D (St3). An order in which the signature S and the optional data D are connected (linked) may not be limited. The authorization data generation apparatus 10 transmits the authorization data T generated in step St3 to the client apparatus 30 using a communication path with high security (for example, mutually authenticated BLE) formed between the authorization data generation apparatus 10 and the client apparatus 30 (St4).

The client apparatus 30 forms a communication path with high security (for example, mutually authenticated BLE) with the verification apparatus 20. The client apparatus 30 generates, for example, a request Y (for example, applications of issuance of a certificate of the client apparatus 30 and transmission of the certificate to the client apparatus 30) based on an operation of a user using the operation device 31, and transmits the request Y to the verification apparatus 20 via the above communication path while including the authorization data T transmitted from the authorization data generation apparatus 10 in step St4 in the request Y (St5).

The verification apparatus 20 extracts and acquires the authorization data T included in the request Y transmitted from the client apparatus 30 in step St5. The verification apparatus 20 decrypts the signature S constituting the authorization data T by using the public key of the authorization data generation apparatus 10 included in the certificate CERT1 of the client apparatus 30 stored in step St2 (St6). The verification apparatus 20 calculates a hash value of the optional data D constituting the authorization data T by using the predetermined hash function between the authorization data generation apparatus 10 and the verification apparatus 20. The verification apparatus 20 determines whether the verification of the authorization data T is successful or failed, depending on whether the hash value is the same as the decrypted data F obtained by the decryption (St6).

When it is determined that the verification of the authorization data T is successful, the verification apparatus 20 issues the electronic certificate of the client apparatus 30 as a response to the request Y and transmits the electronic certificate to the client apparatus 30 via the above communication path with high security (St7). Although an example in which the request is the applications of the issuance of the certificate of the client apparatus 30 and the transmission of the certificate to the client apparatus 30, and the response is the issuance of the certificate of the client apparatus 30 and the transmission of the certificate to the client apparatus 30 has been described here, examples of the request and the response are not limited thereto. For example, the request may be an application to access a data file in the verification apparatus 20 or a file management server (not shown), or to grant an access authority to the data file, and the response may be to access the data file in the verification apparatus 20 or the file management server (not shown), or to grant the access authority to the data file. On the other hand, when it is determined that the verification of the authorization data T fails, the verification apparatus 20 generates an error notification indicating that the verification of the authorization data T fails, and transmits the error notification to the client apparatus 30 via the above communication path with high security (St7).

In FIG. 3B, the verification apparatus 20 downloads and acquires the CA certificate CAT from the certification authority (CA) in advance (St0), and stores the CA certificate CAT in the memory 22 (St2A). Instead of downloading the CA certificate CAT from the certification authority (CA) in advance, the verification apparatus 20 may acquire the CA certificate CAT from the authorization data generation apparatus 10 and store the CA certificate CAT in the memory 22 when the authorization data generation apparatus 10 stores the CA certificate CAT.

The authorization data generation apparatus 10 generates the optional data D such as a random number and generates the signature S by encrypting a hash value (that is, Hash (optional data D)) using the private key PRK1 of the authorization data generation apparatus 10 (St3A). The authorization data generation apparatus 10 generates the authorization data T by connecting (linking) the generated signature S, the optional data D, and the certificate CERT1 generated for the authorization data generation apparatus 10 from the certification authority (CA) (St3A). An order in which the signature S, the optional data D, and the certificate CERT1 are connected (linked) may not be limited.

The verification apparatus 20 extracts and acquires the authorization data T included in the request Y transmitted from the client apparatus 30 in step St5 (St6-1). Using the CA certificate CAT stored in step St2A, the verification apparatus 20 verifies whether the certificate CERT1 constituting the authorization data T acquired in step St6-1 is a certificate generated (issued) by the certification authority (CA) (St6-1). For example, the verification apparatus 20 decrypts a signature included in the CA certificate CAT using the public key of the CA included in the CA certificate CAT, and determines whether a calculation result of a hash value of optional data included in the CA certificate CAT (herein, the hash function is known in the certification authority (CA), the authorization data generation apparatus 10, and the verification apparatus 20) is the same as a decryption result of the above signature. When it is determined that the calculation result of the hash value is the same as the decryption result of the above signature, the verification apparatus 20 determines that the certificate CERT1 constituting the authorization data T acquired in step St6-1 is the certificate generated (issued) by the certification authority (CA) (St6-1).

Further, when the verification in step St6-1 is successful (that is, when it is determined that the calculation result of the hash value is the same as the decryption result of the above signature), the verification apparatus 20 decrypts the signature S constituting the authorization data T transmitted from the client apparatus 30 in step St5 using the public key of the authorization data generation apparatus 10 included in the certificate CERT1 transmitted from the client apparatus 30 in step St5 (St6-2). The verification apparatus 20 calculates the hash value of the optional data D constituting the authorization data T by using the predetermined hash function between the authorization data generation apparatus 10 and the verification apparatus 20. The verification apparatus 20 determines whether the verification of the authorization data T is successful or failed, depending on whether the hash value is the same as the decrypted data F obtained by the decryption (St6-2). In this way, by two-stage verification of step St6-1 and step St6-2, the verification apparatus 20 may determine whether to provide the response to the request transmitted from the client apparatus 30 in step St5. Accordingly, even when, for example, the plurality of authorization data generation apparatuses 10 are provided, by simply downloading and acquiring the CA certificate CA1 from the certification authority (CA), the verification apparatus 20 can individually and easily verify the authorization data included in the request from the client apparatus 30 without acquiring and sharing the certificate CERT1 in advance with the plurality of authorization data generation apparatuses 10, and can avoid the compression of the memory capacity that may be caused by storing the plurality of certificates CERT1.

As described above, in the request verification system 1 according to the first embodiment, the authorization data generation apparatus 10 and the verification apparatus 20 are communicably connected to each other. The authorization data generation apparatus 10 generates the authorization data AUTH1 by applying the signature of the optional data DTA1 to the optional data DTA1, and transmits the authorization data AUTH1 to the client apparatus 30. The verification apparatus 20 verifies the authorization data AUTH1 when receiving a service use request including the authorization data AUTH1 from the client apparatus 30. When it is determined that the verification of the received authorization data AUTH1 is successful, the verification apparatus 20 provides a service corresponding to the request to the client apparatus 30, and when it is determined that the verification of the received authorization data AUTH1 fails, the verification apparatus 20 transmits the error notification to the client apparatus 30.

That is, in the request verification system 1, unlike the above Patent Literature 1, the private information of the client apparatus 30 is not shared from the authorization data generation apparatus 10 to the verification apparatus 20. The authorization data AUTH1 is not generated so as to include the private information of the client apparatus 30, and is merely generated based on a random number, a counter value, or the like having no privacy. Accordingly, the request verification system 1 can safely verify the request of the user from the client apparatus 30 without leaking the private information of the client apparatus 30 in the communication path, and can prevent a decrease in security of the client apparatus 30.

The authorization data generation apparatus 10 shares the electronic certificate (for example, the certificate CERT1) including the public key of the authorization data generation apparatus 10 with the verification apparatus 20. The verification apparatus 20 verifies the authorization data AUTH1 included in the request using the public key included in the shared electronic certificate. Accordingly, the request verification system 1 can safely execute transmission and reception of the authorization data AUTH1 between the authorization data generation apparatus 10 and the client apparatus 30 and between the client apparatus 30 and the verification apparatus 20 using PKI (a public key infrastructure).

The authorization data generation apparatus 10 generates the signature by encrypting the optional data DTA1 with the private key of the authorization data generation apparatus 10. The verification apparatus 20 determines success or failure of the verification of the authorization data AUTH1 depending on whether data obtained by decrypting the signature included in the received authorization data AUTH1 with the public key is the same as data based on the optional data DTA1 (for example, the hash value of the optional data) included in the authorization data AUTH1. Accordingly, the request verification system 1 can safely and easily verify the request from the client apparatus 30.

Second Embodiment

In a request verification system according to a second embodiment, a verification apparatus constituting the request verification system generates an identification (ID) corresponding to a client apparatus and transmits the ID to an authorization data generation apparatus. The authorization data generation apparatus generates authorization data by using the ID corresponding to the client apparatus transmitted from the verification apparatus as optional data. When it is determined that verification of the authorization data included in a request from the client apparatus is successful, the verification apparatus specifies a service corresponding to the ID included in the authorization data and provides the service to the client apparatus.

Figure 4:
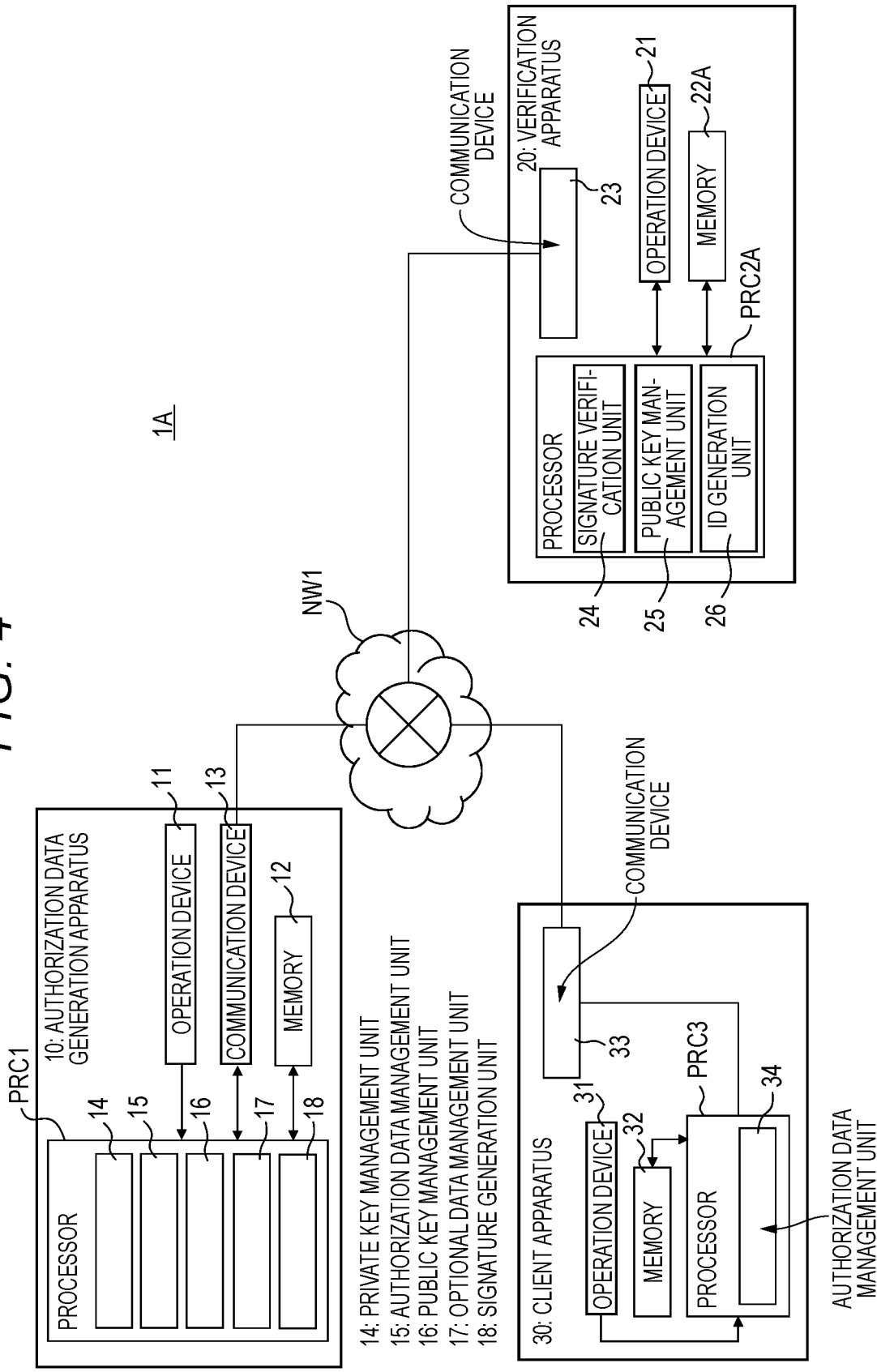
FIG. 4 is a block diagram showing a hardware configuration example of each apparatus constituting a request verification system according to a second embodiment.

FIG. 4 is a block diagram showing a hardware configuration example of each apparatus constituting a request verification system 1A according to the second embodiment. The request verification system 1A shown in FIG. 4 includes the authorization data generation apparatus 10, a verification apparatus 20A, and the client apparatus 30. In description of FIG. 4, the same reference numerals are assigned to components having the same configuration as those in FIG. 2, description thereof will be simplified or omitted, and different contents will be described.

The verification apparatus 20A includes the operation device 21, a memory 22A, the communication device 23, and a processor PRC2A.

The processor PRC2A includes, for example, at least one of a CPU, a DSP, an FPGA, and a GPU. The processor PRC2A controls an operation of each unit of the verification apparatus 20A. The processor PRC2A may control the operation of the unit of the verification apparatus 20A based on a signal from the operation device 21. The processor PRC2A functions as a control unit of the verification apparatus 20A, and performs a control process for controlling the overall operations of the units of the verification apparatus 20A, a data input and output process to and from the units of the verification apparatus 20A, a data calculation (computing) process, and a data storage process. The processor PRC2A operates in accordance with execution of a program stored in a ROM in the memory 22A. The processor PRC2A includes the signature verification unit 24, the public key management unit 25, and an ID generation unit 26 as a functional configuration based on the execution of the above program.

The memory 22A includes, for example, a RAM and the ROM, and temporarily stores a program necessary for executing an operation of the verification apparatus 20A and data or information generated by the processor PRC2A during the operation. The RAM is, for example, a work memory used during an operation of the processor PRC2A. The ROM stores in advance, for example, a program and data for controlling the processor PRC2A. The memory 22A may include a storage such as an HDD, a flash memory, or an SSD capable of storing data acquired or generated by the processor PRC2A. The memory 22A stores an ID (for example, a combination of four-digit alphanumeric characters) of the authorization data generation apparatus 10, a counter value (for example, a 16-digit hexadecimal number) output by a counter (for example, built in the processor PRC2A) incremented every time an ID is generated, and data of an ID certificate table TBL1 (see FIG. 5).

The ID generation unit 26 reads the ID of the authorization data generation apparatus 10 (for example, the combination of four-digit alphanumeric characters) and the counter value (for example, the 16-digit hexadecimal number) from the memory 22A, and generates and stores an ID (for example, a combination of 20-digit alphanumeric characters) including the ID of the authorization data generation apparatus 10 and the counter value.

FIG. 5 is a diagram showing an outline example of a procedure for determining a certificate to be issued corresponding to an ID. As shown in FIG. 5, the ID generation unit 26 generates the ID in which the ID (for example, "01AA") of the authorization data generation apparatus 10 and the counter value (for example, "0000000000000001") are connected. The ID certificate table TBL1 is stored in, for example, the memory 22A, and IDs are associated with types of certificates to be issued, respectively. Examples of the types of the certificates include a server certificate with an expiration date of 10 years, a client certificate with an expiration date of one year, a code inning certificate with an expiration date of 10 years, and so on.

The server certificate certifies that an access authority to a Web server (not shown) providing a Web service is authorized, for example. The client certificate certifies that the client apparatus 30 is a valid client apparatus when the client apparatus 30 is authenticated by an authentication server (not shown), for example. The code inning certificate certifies that a program code to be verified or authenticated is a valid program code, for example.

When it is determined that verification of authorization data included in a request from the client apparatus 30 is successful, the verification apparatus 20A (for example, the signature verification unit 24) specifies, based on an ID constituting the authorization data and the ID certificate table TBL1, a type of a certificate corresponding to the ID. The verification apparatus 20A issues the certificate of the specified type and transmits the certificate to the client apparatus 30.

Figure 6:
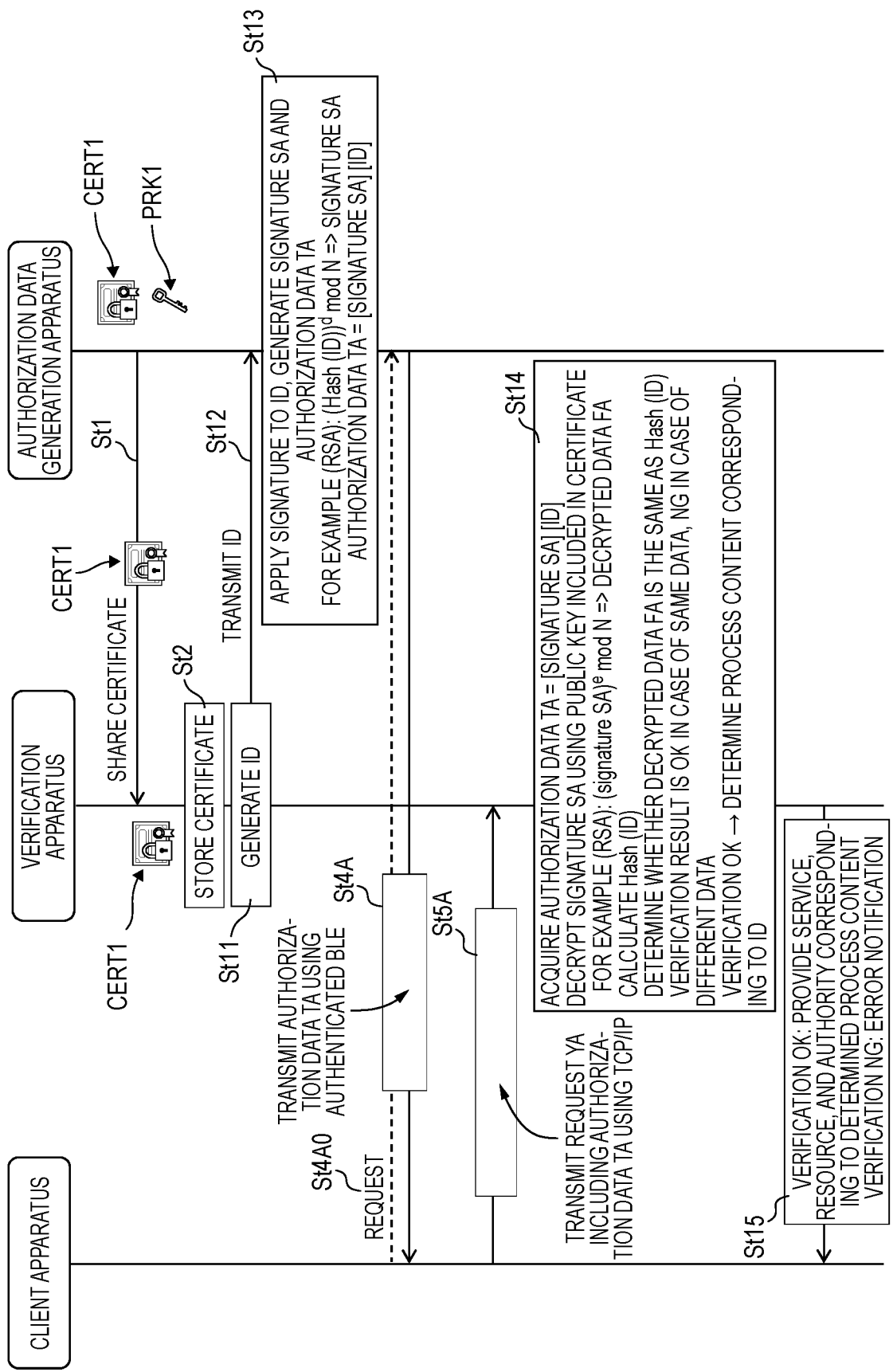
FIG. 6 is a sequence diagram showing an example of an operation procedure of the request verification system according to the second embodiment.

Next, an operation procedure of the request verification system TA according to the second embodiment will be described with reference to FIG. 6. FIG. 6 is a sequence diagram showing an example of the operation procedure of the request verification system TA according to the second embodiment. In description of FIG. 6, the same step numbers are assigned to the same processes as those in FIG. 3A or 3B, description thereof will be simplified or omitted, and different contents will be described.

In FIG. 6, after step St2, the verification apparatus 20A generates the ID (for example, the combination of 20-digit alphanumeric characters) including the ID (for example, the combination of four-digit alphanumeric characters) of the authorization data generation apparatus 10 and the counter value (for example, the 16-digit hexadecimal number) (St11), and transmits the generated ID to the authorization data generation apparatus 10 (St12).

The authorization data generation apparatus 10 generates a signature SA by encrypting, using the private key PRK1 of the authorization data generation apparatus 10, a hash value (that is, see Hash (ID)) of the ID transmitted in step St12 (St13). The authorization data generation apparatus 10 generates authorization data TA by connecting (linking) the signature SA generated in step St13 to the ID transmitted in step St12 (St13). The authorization data generation apparatus 10 transmits the authorization data TA generated in step St13 to the client apparatus 30 using the communication path with high security (for example, the mutually authenticated BLE) formed between the authorization data generation apparatus 10 and the client apparatus 30 (St4A). When there is a request from the client apparatus 30 for transmission of the authorization data TA, the authorization data generation apparatus 10 may transmit the authorization data TA to the client apparatus 30 (St4A0).

The client apparatus 30 forms a communication path with high security (for example, mutually authenticated BLE) with the verification apparatus 20A. The client apparatus 30 generates, for example, a request YA (for example, provision of a service corresponding the ID) based on an operation of the user using the operation device 31, and transmits the request YA to the verification apparatus 20 via the above communication path while including the authorization data TA transmitted from the authorization data generation apparatus 10 in step St4A in the request YA (St5A).

The verification apparatus 20A extracts and acquires the authorization data TA included in the request YA transmitted from the client apparatus 30 in step St5A. The verification apparatus 20A decrypts the signature SA constituting the authorization data TA by using the public key of the authorization data generation apparatus 10 included in the certificate CERT1 of the client apparatus 30 stored in step St2 (St14). The verification apparatus 20A calculates the hash value of the ID (see step St11) constituting the authorization data TA by using a predetermined hash function between the authorization data generation apparatus 10 and the verification apparatus 20A. The verification apparatus 20A determines whether verification of the authorization data TA is successful or failed, depending on whether the hash value is the same as decrypted data FA obtained by the decryption (St14).

When it is determined that the verification of the authorization data TA is successful, the verification apparatus 20A issues a certificate (for example, see FIG. 5) corresponding to the ID constituting the authorization data TA in step St14 as a response to the request YA, and transmits the certificate to the client apparatus 30 via the above communication path with high security (St15).

As described above, in the request verification system TA according to the second embodiment, the verification apparatus 20A generates an ID corresponding to the client apparatus 30 and transmits the ID to the authorization data generation apparatus 10. The authorization data generation apparatus 10 generates the authorization data TA using the ID (for example, see the combination of 20-digit alphanumeric characters shown in FIG. 5) as optional data, and transmits the authorization data TA to the client apparatus 30. When it is determined that verification of the received authorization data TA is successful, the verification apparatus 20A provides a service (for example, issuance of a certificate) corresponding to the ID included in the received authorization data TA to the client apparatus 30. Accordingly, similarly to an effect of the request verification system 1 according to the first embodiment, the request verification system TA can adaptively provide, to the client apparatus 30, the service corresponding to the ID generated by the verification apparatus 20A when the verification of the authorization data TA transmitted from the client apparatus 30 is successful.

The authorization data generation apparatus 10 may generate the authorization data TA only once using the same ID. In this case, the verification apparatus 20A stores the ID included in the received authorization data TA every time the verification is performed, and rejects verification of authorization data TA including the same ID as the stored ID. Accordingly, in the request verification system 1A, the generation of the authorization data TA for the same ID and the verification of the authorization data TA are performed only once, and thus even if a plurality of IDs or authorization data TAs are copied and a reply attack is received, the service corresponding to the ID is provided only once, so that a decrease in security during provision of the service can be prevented.

In the request verification system TA, a plurality of authorization data generation apparatuses 10 may be provided. The verification apparatus 20A generates an ID including identification information (for example, a manufacturing number) of the authorization data generation apparatus 10, and transmits the generated ID to the authorization data generation apparatus 10 corresponding to the identification information. Accordingly, the request verification system TA can easily determine which authorization data generation apparatus 10 generates authorization data by determining the ID constituting the authorization data TA by the verification apparatus 20A at the time of the verification, and can improve convenience during the provision of the service.

The verification apparatus 20A may store, in the memory 22A, in association with the ID, authorization data invalidation information indicating whether validity of the authorization data TA generated by the authorization data generation apparatus 10 is invalidated. In this case, the verification apparatus 20A performs, based on an invalidation instruction from the authorization data generation apparatus 10, an invalidation process on the validity of the authorization data subject to the invalidation instruction. Accordingly, even if the authorization data TA is stolen by a malicious third party or lost while the authorization data TA is transmitted from the authorization data generation apparatus 10 to the client apparatus 30, the verification apparatus 20A can perform, based on the invalidation instruction from the authorization data generation apparatus 10, the invalidation process on the validity of the authorization data TA subject to the invalidation instruction, can prevent the stolen or lost authorization data from being misused, and can improve security.

The verification apparatus 20A may set an expiration date of the ID and transmit, to the authorization data generation apparatus 10, the ID in which the expiration date is set. In this case, the authorization data generation apparatus 10 generates the authorization data TA having the same expiration date as the expiration date. Accordingly, the request verification system 1A can reduce misuse of the authorization data TA by a malicious third party, as compared with a case where the request verification system 1A has an indefinite expiration date unnecessarily.

The authorization data generation apparatus 10 generates the authorization data TA using connection destination information (for example, uniform resource locator (URL) or an IP address) to the verification apparatus 20A as optional data, and transmits the authorization data TA to the client apparatus 30. Accordingly, even if a destination of the verification apparatus 20A is not known, the client apparatus 30 can easily access the verification apparatus 20A based on the connection destination information included in the authorization data TA. Therefore, it is possible to omit presetting of the connection destination information of the verification apparatus 20A to be accessed in the client apparatus 30 when a service is used.

Third Embodiment

In a request verification system according to a third embodiment, as a further application example of the first embodiment or the second embodiment, when a verification apparatus constituting the request verification system receives, from a client apparatus, a request for use of an application acquired from a download server by the client apparatus, the verification apparatus verifies encrypted authorization data (see below) included in the request. When it is determined that the verification is successful, the verification apparatus authorizes the use of the application and transmits the authorization to the client apparatus as a response to the request. When it is determined that the verification fails, the verification apparatus transmits an error notification indicating that the verification fails to the client apparatus. Accordingly, even if the authorization data transmitted from the authorization data generation apparatus to the client apparatus is leaked by any chance and the authorization data is forged, the request verification system can effectively block use of the forged authorization data or can deny approval of use of an application in association with the authorization data even if a request using the forged authorization data is received, thereby improving security.

Figure 7:
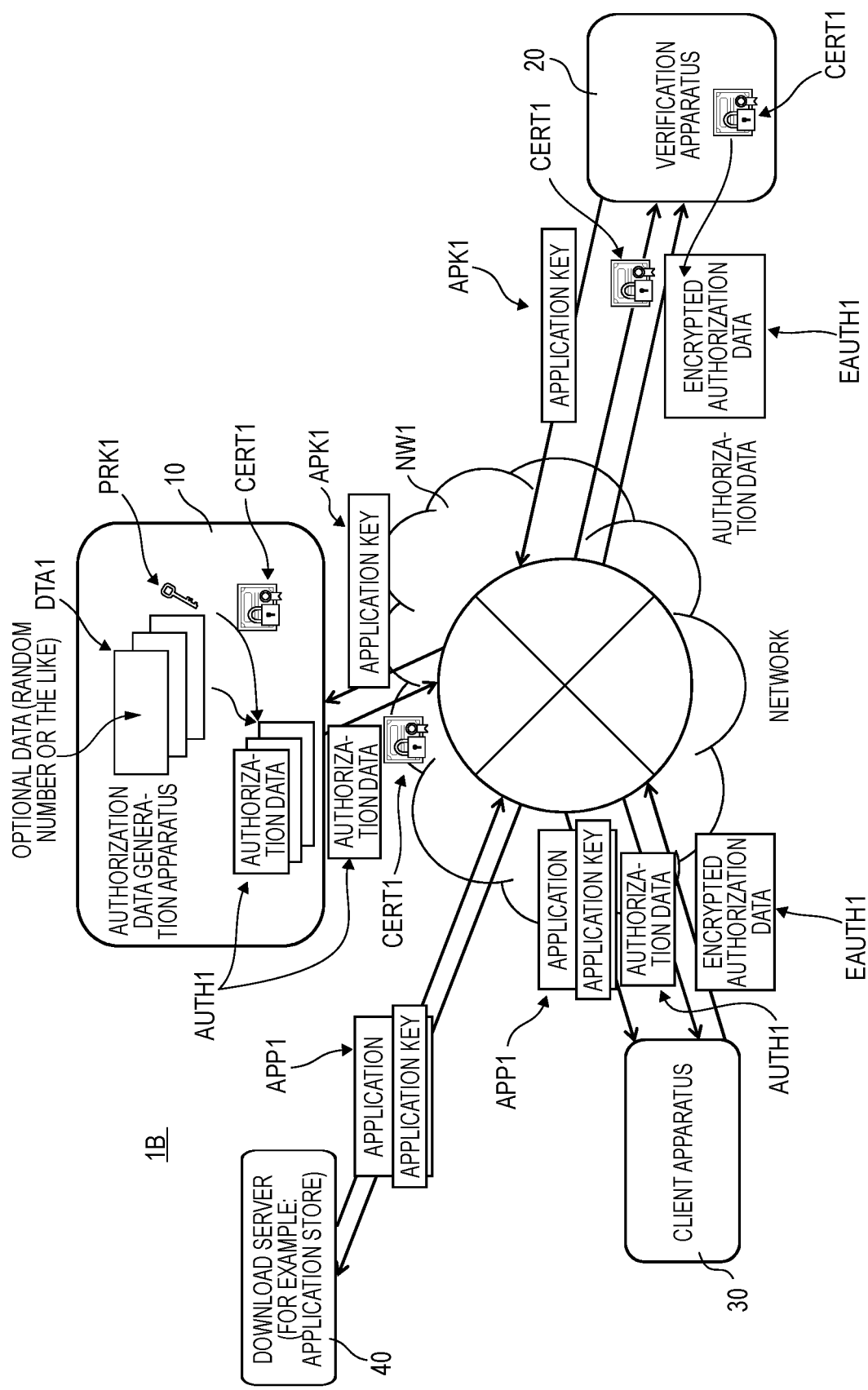
FIG. 7 is a diagram showing a system configuration example of a request verification system according to a third embodiment.

FIG. 7 is a diagram showing a system configuration example of a request verification system 1B according to the third embodiment. The request verification system 1B includes the authorization data generation apparatus 10, the verification apparatus 20, the client apparatus 30, and a download server 40. In description of FIG. 7, the same reference numerals are assigned to components having the same configuration as those in FIG. 1, description thereof will be simplified or omitted, and different contents will be described. The hardware configurations of the authorization data generation apparatus 10, the verification apparatus 20, and the client apparatus 30 according to the third embodiment are the same as those of the corresponding apparatuses according to the first embodiment, and thus detailed description thereof will be omitted. Although only one client apparatus 30 is shown in FIG. 7, two or more client apparatuses 30 may be connected to the network NW1. The authorization data generation apparatus 10, the client apparatus 30, and the download server 40 are communicably connected to each other via the network NW1.

In the third embodiment, the verification apparatus 20 used by a service provider generates an application key APK1 and transmits the application key APK1 to the authorization data generation apparatus 10 used by, for example, an application manufacturer. The application key APK1 is constituted by, for example, a common key or a password of AES, is shared between the authorization data generation apparatus 10 and the verification apparatus 20, and is used to encrypt an application APP1 generated by the authorization data generation apparatus 10. When the application APP1 is generated, the authorization data generation apparatus 10 uploads data of the application APP1 including the application key APK1 to the download server 40. When the client apparatus 30 downloads the data of the application APP1 including the application key APK1 from the download server 40, the client apparatus 30 generates encrypted authorization data EAUTH1 by encrypting, with the application key APK1, the authorization data AUTH1 (see the first embodiment) transmitted from the authorization data generation apparatus 10, and transmits a request including the encrypted authorization data EAUTH1 to the verification apparatus 20. The verification apparatus 20 acquires the authorization data AUTH1 by decrypting the encrypted authorization data EAUTH1 with the application key APK1.

The download server 40 is a server computer having a communication function of storing data of one or more applications, and includes a processor such as a CPU, a memory, and a communication device, although a detailed hardware configuration is not shown. When receiving an upload request from the authorization data generation apparatus 10, the download server 40 stores data of an application. When receiving a download request from the client apparatus 30, the download server 40 transmits data of an application designated by the request to the client apparatus 30.

Figure 8:
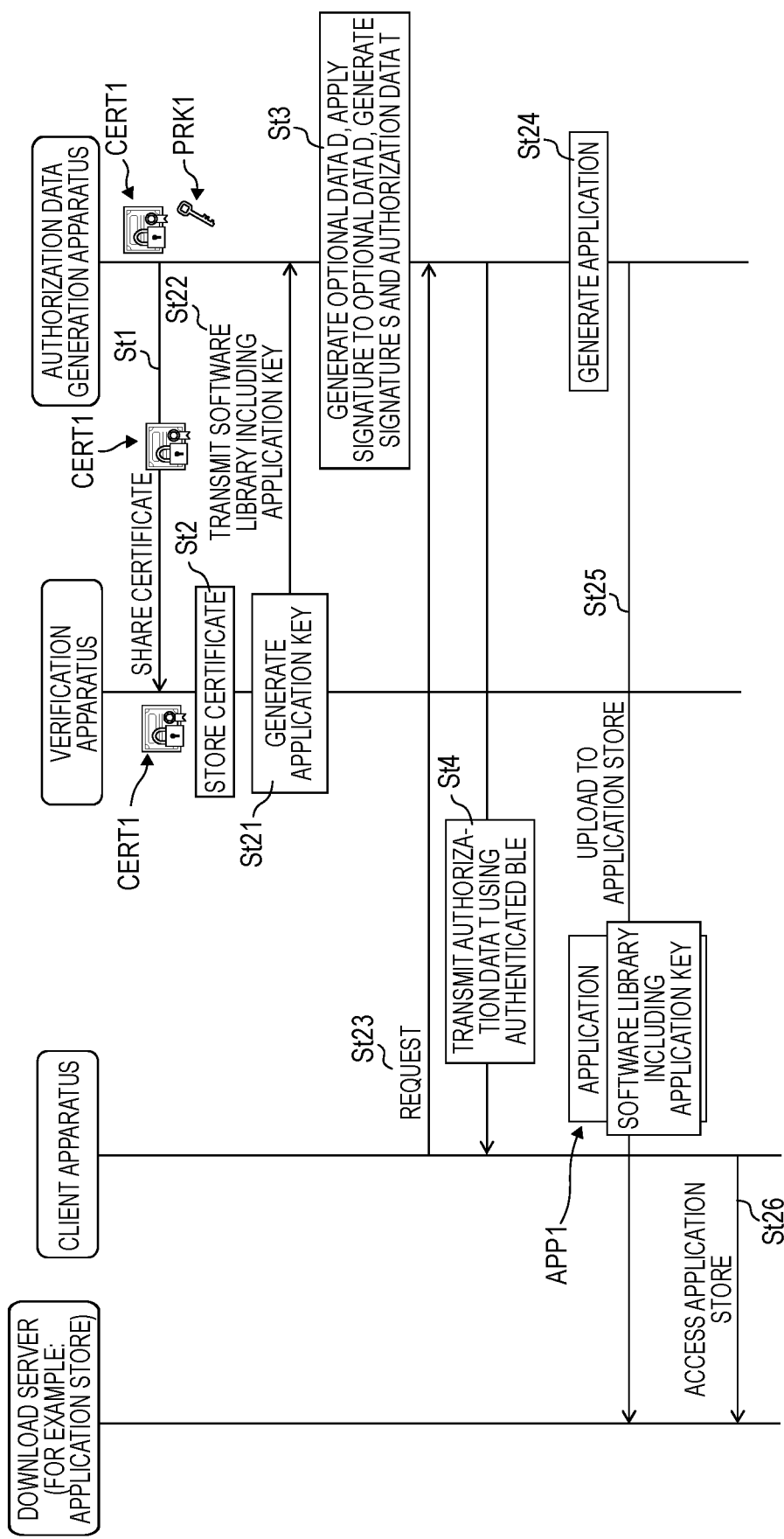
FIG. 8 is a sequence diagram showing an example of an operation procedure of the request verification system according to the third embodiment.
Figure 9:
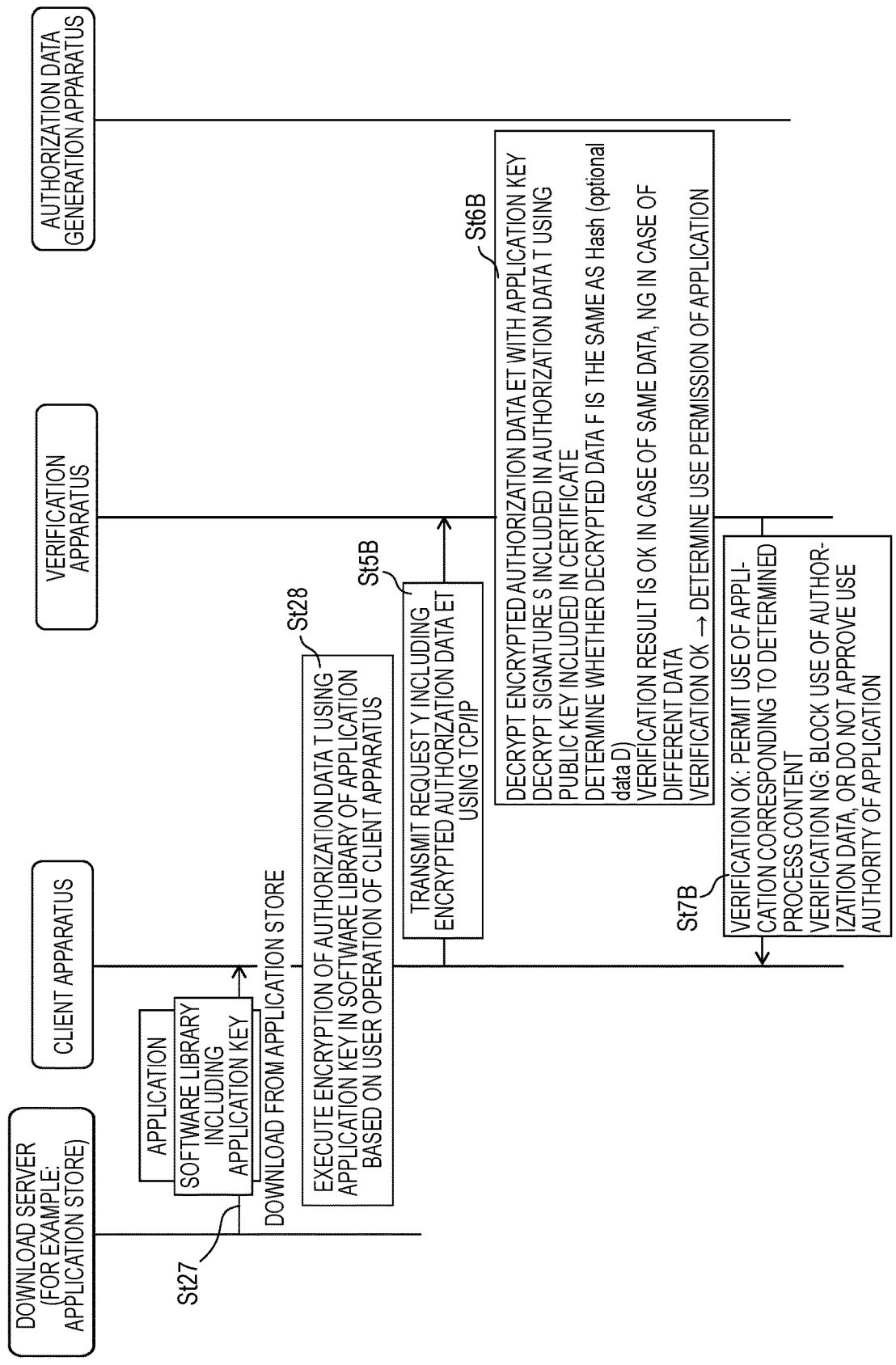
FIG. 9 is a sequence diagram showing an example of the operation procedure of the request verification system according to the third embodiment.

Next, an operation procedure of the request verification system 1B according to the third embodiment will be described with reference to FIGS. 8 and 9. FIGS. 8 and 9 are sequence diagrams each showing an example of the operation procedure of the request verification system 1B according to the third embodiment. In description of FIGS. 8 and 9, the same step numbers are assigned to the same processes as those in FIG. 3A or 3B, description thereof will be simplified or omitted, and different contents will be described. In FIGS. 8 and 9, the download server 40 stores the application APP1 so as to be able to provide the application APP1, and is described as an example of an application store that sells an application.

In FIG. 8, after step St2, the verification apparatus 20 generates an application key APK1 corresponding to an application to be generated by the authorization data generation apparatus 10 (St21). The verification apparatus 20 transmits a software library including the application key APK1 generated in step St21 to the authorization data generation apparatus 10 (St22). The software library includes the application key APK1 (in other words, the application key APK1 is embedded), and is a software component (an application programming interface (API)) for bridging connection to the verification apparatus 20 by calling the software library during execution of an application.

The client apparatus 30 generates a request for requesting transmission of the authorization data T and transmits the request to the authorization data generation apparatus 10 (St23). In response to the request from the client apparatus 30, the authorization data generation apparatus 10 transmits the authorization data T generated in step St3 (see FIG. 3A or 3B) to the client apparatus 30 using the communication path with high security (for example, the mutually authenticated BLE) formed between the authorization data generation apparatus 10 and the client apparatus 30 (St4).

The authorization data generation apparatus 10 receives the software library transmitted from the verification apparatus 20 in step St22, and generates an application that is executable by calling the software library (St24). The authorization data generation apparatus 10 uploads (transmits), to the download server 40, data of the application APP1 including the software library in which the application key APK1 is embedded (St25).

The client apparatus 30 accesses the download server 40 (for example, the application store) (St26).

In FIG. 9, the client apparatus 30 downloads and acquires, from the download server 40, the data of the application APP1 including the software library in which the application key APK1 is embedded (St27). Based on a user operation of the client apparatus 30, the client apparatus 30 generates the encrypted authorization data EAUTH1 by encrypting the authorization data T transmitted in step St4 with the application key APK1, and inputs and sets the encrypted authorization data EAUTH1 in the software library of the application APP1 (St28). The client apparatus 30 transmits, to the verification apparatus 20, a request Y for permitting use of the application APP1 while including the encrypted authorization data EAUTH1 in the request Y (St5B).

The verification apparatus 20 extracts and acquires the encrypted authorization data EAUTH1 included in the request Y transmitted from the client apparatus 30 in step St5B. The verification apparatus 20 decrypts the encrypted authorization data EAUTH1 with the application key APK1 generated in step St21 (St6B). The verification apparatus 20 decrypts the signature S constituting the authorization data T obtained by decryption, by using the public key of the authorization data generation apparatus 10 included in the certificate CERT1 of the client apparatus 30 stored in step St2 (St6B). The verification apparatus 20 calculates a hash value of the optional data D constituting the authorization data T by using the predetermined hash function between the authorization data generation apparatus 10 and the verification apparatus 20. The verification apparatus 20 determines whether the verification of the authorization data T is successful or failed, depending on whether the hash value is the same as the decrypted data F obtained by the decryption (St6B).

When it is determined that the verification of the authorization data T is successful, the verification apparatus 20 generates authority information for permitting the use of the application APP1 and transmits the authority information to the client apparatus 30 as a response to the request Y (St7B). On the other hand, when it is determined that the verification of the authorization data T fails, the verification apparatus 20 generates an error notification indicating that the use of the application APP1 is not permitted, and transmits the error notification to the client apparatus 30 via the above communication path with high security (St7B). For example, even if the authorization data T transmitted from the authorization data generation apparatus 10 to the client apparatus 30 is leaked by any chance and the authorization data T is forged by a malicious third party, the verification apparatus 20 does not succeed in the verification in step St6B unless the application key APK1 is acquired. Therefore, it is possible to effectively block the use of the authorization data forged by the malicious third party, or to reject (deny) the use of the application APP1 other than the application key APK1 in association with the authorization data, thereby improving the security.

As described above, in the request verification system 1B according to the third embodiment, when the verification apparatus 20 constituting the request verification system 1B receives, from the client apparatus 30, the request Y for the use of the application APP1 acquired from the download server 40 such as the application store by the client apparatus 30, the verification apparatus 20 verifies the encrypted authorization data EAUTH1 included in the request Y When it is determined that the verification is successful, the verification apparatus 20 authorizes the use of the application APP1 and transmits the authorization to the client apparatus 30 as the response to the request Y When it is determined that the verification fails, the verification apparatus 20 transmits the error notification indicating that the verification fails to the client apparatus 30.

Accordingly, the request verification system 1B can appropriately determine whether to permit the use of the application APP1 from the client apparatus 30 by double verification such as a first verification of whether the encrypted authorization data EAUTH1 transmitted from the client apparatus 30 can be appropriately decrypted with the application key APK1 and a second verification of whether the authorization data AUTH1 obtained by the decryption can be verified, without using the private information of the client apparatus 30. Accordingly, in the request verification system 1B, even if the authorization data T transmitted from the authorization data generation apparatus 10 to the client apparatus 30 is leaked by any chance and the authorization data T is forged by a malicious third party, the verification apparatus 20 does not succeed in the verification unless the application key APK1 is acquired. Therefore, even if a request using the forged authorization data is received, it is possible to effectively block the use of the forged authorization data, or to deny approval of the use of an application in association with the authorization data, thereby improving the security.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined freely within a range not departing from the spirit of the invention.

The present disclosure is useful as a request verification system and a request verification method that safely verify a request of a user without leaking private information of a client apparatus and preventing a decrease in security of the client apparatus.

What is claimed is:

1. A request verification system, comprising:
an authorization data generation apparatus that includes a first processor and a first memory, stores a certificate including a public key, and is configured to generate and output authorization data for authorizing a providing of a service; and
a verification apparatus that includes a second processor and a second memory, and shares the certificate with the authorization data generation apparatus; and
a computer that includes a third processor and a third memory, wherein
the verification apparatus generates an identification (ID) corresponding to the computer and transmits the ID to the authorization data generation apparatus,
the authorization data generation apparatus generates the authorization data using the ID as optional data included in the authorization data and transmits the authorization data to the computer,
the verification apparatus, in response to receiving a verification request of the authorization data from the computer, verifies the authorization data using the certificate,
the verification apparatus provides, in a case that verification of the authorization data is successful, the service corresponding to the ID included in the authorization data to the computer,
the authorization data generation apparatus generates the authorization data only once using the ID, and
the verification apparatus stores the ID included in the authorization data received in the verification request every time the verification is performed, and rejects a second verification request of second authorization data including a same ID as the ID.

2. The request verification system according to claim 1, wherein
the verification apparatus is configured to transmit, when the verification of the authorization data fails, an error notification to the computer.

3. The request verification system according to claim 1, wherein the authorization data generation apparatus stores a private key of the authorization data generation apparatus, and is configured to generate a signature by encrypting the optional data with the private key.

4. The request verification system according to claim 3, wherein
the verification apparatus is configured to determine success or failure of the verification of the authorization data depending on whether data obtained by decrypting the signature with the public key is same as data based on the optional data included in the authorization data.

5. The request verification system according to claim 1, further comprising:
a plurality of the authorization data generation apparatus,
wherein the verification apparatus is configured to generate the ID including identification information of one of the plurality of the authorization data generation apparatus, and transmit the ID to the one of the plurality of the authorization data generation apparatus corresponding to the identification information.

6. The request verification system according to claim 1, wherein
the verification apparatus is configured to
store, in association with the ID, authorization data invalidation information indicating whether validity of the authorization data generated by the authorization data generation apparatus is invalidated, and
perform, based on an invalidation instruction from the authorization data generation apparatus, an invalidation process on validity of authorization data subject to the invalidation instruction.

7. The request verification system according to claim 1, wherein
the verification apparatus is configured to set an expiration date of the ID and transmit, to the authorization data generation apparatus, the ID in which the expiration date is set, and
the authorization data generation apparatus is configured to generate the authorization data having the expiration date.

8. The request verification system according to claim 3, wherein
the authorization data generation apparatus is configured to generate the authorization data using connection destination information to the verification apparatus as the optional data, and transmit the authorization data to the computer.

9. A request verification method, comprising:
generating, by a verification apparatus, that includes a second processor and a second memory, an identification (ID) corresponding to a computer, that includes a third processor and a third memory, and transmitting the ID to an authorization data generation apparatus, that includes a first processor and a first memory;
generating and outputting, by the first processor of the authorization data generation apparatus, authorization data for authorizing a providing of a service, and storing, by the first memory of the authorization data generation apparatus, a certificate including a public key;
sharing the certificate with the verification apparatus; and
in response to receiving a verification request of the authorization data from the computer, verifying, by the verification apparatus, the authorization data using the certificate; and providing, in a case that verification of the authorization data is successful, the service corresponding to the ID included in the authorization data to the computer, wherein the authorization data generation apparatus generates the authorization data using the ID as optional data included in the authorization data, the authorization data generation apparatus generates the authorization data only once using the ID, and the verification apparatus stores the ID included in the authorization data received in the verification request every time the verification is performed, and rejects a second verification request of second authorization data including a same ID as the ID.

\* \* \* \* \*